INVENTOR.
Frithjof J. Lindstrom
Attorney

May 12, 1953 F. J. LINDSTROM 2,638,293
RESTRAINING AND RELEASING DEVICE FOR PILOTS
Filed Feb. 10, 1951 5 Sheets-Sheet 4

INVENTOR.
Frithjof J. Lindstrom
BY
Attorney

Patented May 12, 1953

2,638,293

UNITED STATES PATENT OFFICE 2,638,293

RESTRAINING AND RELEASING DEVICE FOR PILOTS

Frithjof J. Lindstrom, Stratford, Conn., assignor to United Aircraft Corporation, East Hartford, Conn., a corporation of Delaware Application February 10, 1951, Serial No. 210,304

13 Claims. (Cl. 244—122)

This invention relates to apparatus for releasing the occupant of a vehicle from his seat and for restraining the head of the occupant from movement during extreme oscillations of the vehicle.

In modern high speed aircraft, especially aircraft which fly at or near sonic speeds, and more particularly fighter type aircraft, extreme conditions of buffeting and other undesirable aerodynamic disturbances have created a demand for pilot head supporting and head restraining devices. In Patent No. 2,619,157, dated November 25, 1952, and assigned to the assignee of the present application, an anti-buffet seat was disclosed wherein the body of the pilot could be firmly restrained and would not be subjected to the full effects of severe buffeting, and any ill effects from severe buffeting would be reduced to a minimum as the pilot would be firmly restrained by the wing-like projections of the anti-buffet seat. It has now become necessary to devise a method for restraining the pilot's head in a firm position at all times while still allowing the pilot the vital freedom of head movement.

It is an object of this invention to provide a head support which will allow free movement of the head under all normal conditions, but which will automatically firmly restrain the head against movement during conditions of extreme deceleration and buffeting of an aircraft or conveyance.

Another object of this invention is to provide an ejectable pilot's seat having a head restraining and head supporting mechanism.

A still further object of this invention is to provide a helmet which may be releasably secured to a movable restraining means.

A still further object of this invention is to provide an ejectable pilot's seat in which the occupant may be releasably secured.

A yet further object of this invention is to provide a means for releasing an occupant from the head restraining means and head supporting means and the ejectable seat.

These and other objects will become apparent to those skilled in the art from the specification and claims, and from the accompanying drawings which illustrate an embodiment of the invention.

For a better understanding of this invention, reference may be had to the following description taken in connection with the accompanying drawings, and its scope will be pointed out in the appended claims.

The head restraining means of this invention consists of a special helmet which can be connected to inertia reels which allow movement of the head under normal conditions but which restrain the head against such movements when conditions of sudden extreme acceleration and deceleration obtain. The head restraining means also prevents movements of the head during and after ejection of the seat from the airplane and for as long as the conditions of extreme acceleration or deceleration exist. There has been provided in this invention means for ejecting the seat and the occupant, and these head restraining means are associated with the ejectable seat. A device has been provided in the mechanism to automatically disconnect the occupant from the restraining means. This mechanism functions after a predetermined period of time has elapsed after the seat has been ejected from the airplane and a drogue parachute, which is of conventional design and is used to retard the occupant's velocity, has opened.

In the drawings:

Fig. 6 is a rear view of the timing mechanism immediately after reaching the prescribed period of time for activation, a portion of the case being broken away.

Figure 1:
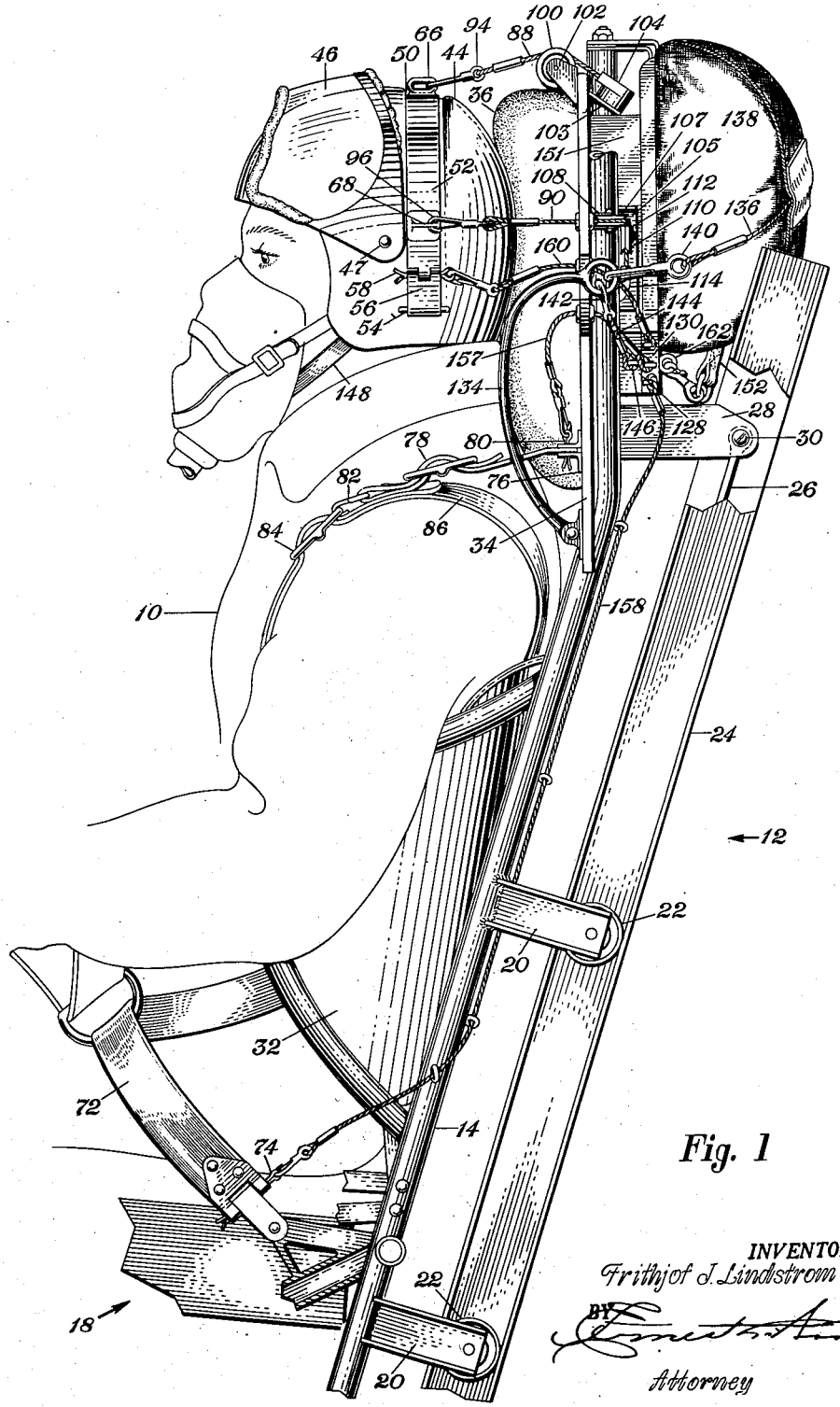
Fig. 1 is a side view of a pilot in a normal position seated in an ejectable pilot's seat provided with the restraining and supporting mechanism of this invention, some of the parts of the seat being partly broken away.
Figure 2:
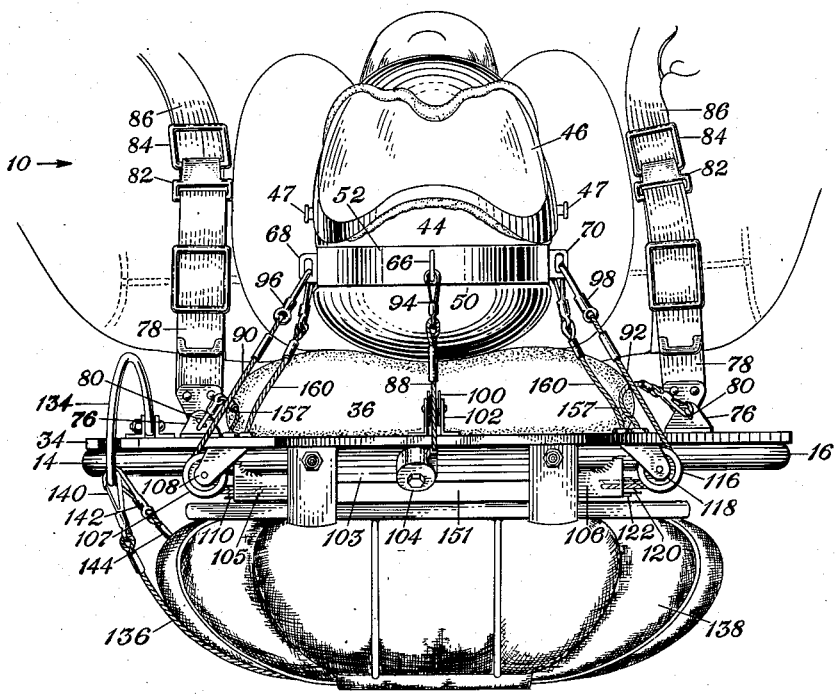
Fig. 2 is a top view of the pilot and a portion of the seat and showing the head restraining means.
Figure 3:
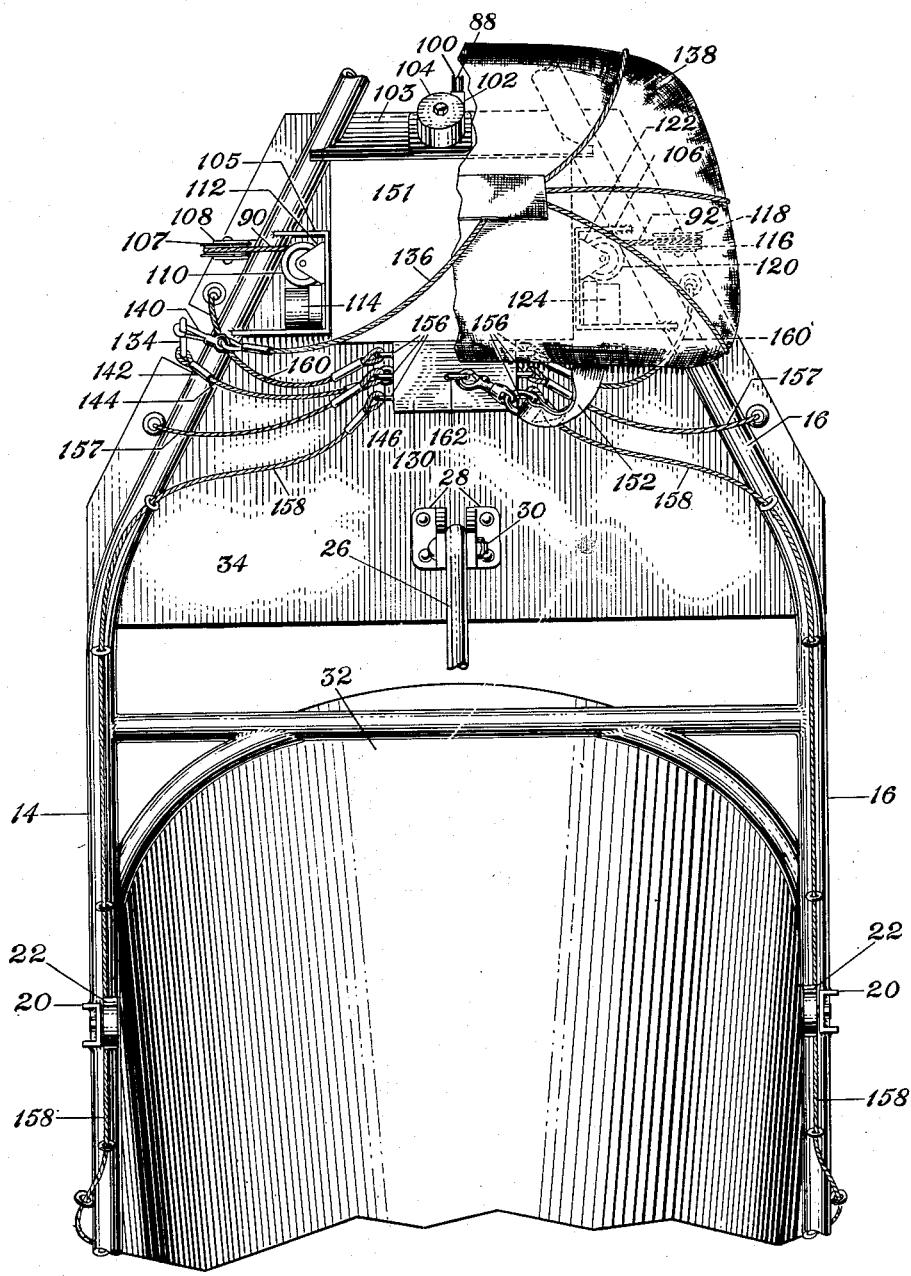
Fig. 3 is a rear view of the seat and restraining and supporting means illustrated in Fig. 1, the left hand portion of the drogue parachute and the lower portion of the seat being broken away.

Referring now to Fig. 1, a pilot 10 is shown in a seat generally indicated at 12. The seat may be of the ejectable type described in Patent No. 2,467,763. The frame is composed of tubular welded steel or other structurally suitable material. To vertical frame risers 14 and 16 is secured a seat bucket 18. The risers 14 and 16 have welded, rearwardly extending brackets 20. To brackets 20 are pivotally secured rollers 22 which ride in oblique tracks 24 rigidly secured to the aircraft fuselage. Between tracks 24 is positioned the seat ejection system as set out in the aforementioned Patent No. 2,467,763. The launcher or piston 26 portion of the ejection mechanism is secured to the seat in any conventional manner, e. g., by the bifurcated bracket 28 and bolt 30. The impeller unit (not shown) of the ejection mechanism is securely fastened to the structure of the aircraft. It may be seen that the activation of a propellant charge against piston 26 will propel the piston upwardly, the piston carrying the seat and pilot out of the aircraft. On frame risers 14 and 16 is secured a back rest 32 of an anti-buffet type which extends forward to encompass the pilot under his arms. This anti-buffet seat is more clearly shown and described in U. S. Patent 2,619,157, dated November 25, 1952, which is assigned to the assignee of this invention.

A plate 34 is rigidly secured to frame risers 14 and 16, which are bent forward and towards each other in the region of the pilot's shoulders. A resilient cushion 36 is attached to plate 34 to provide a head rest for the pilot.

Figure 4:
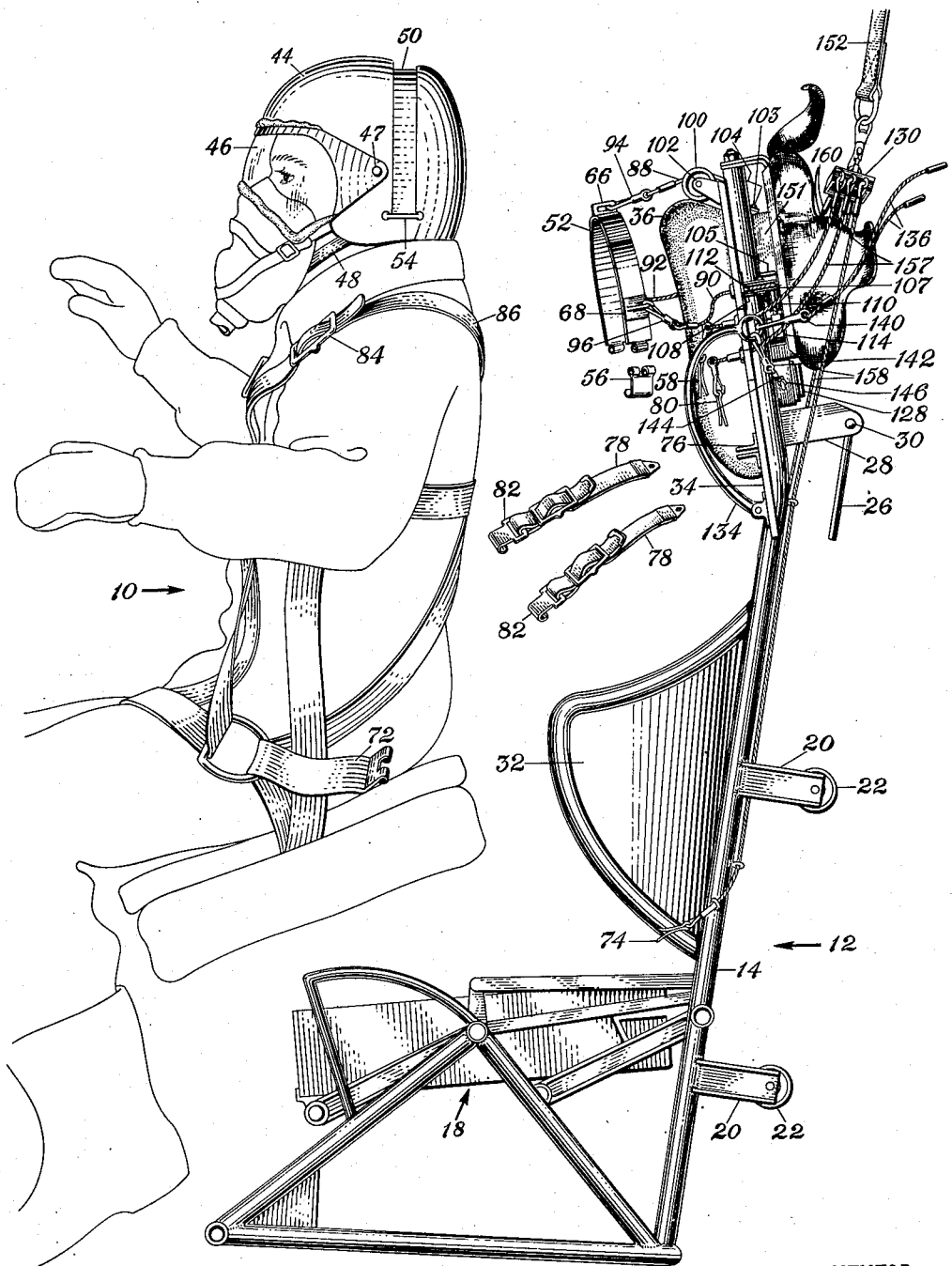
Fig. 4 is a side view of the seat after ejection from the aircraft, and the apparatus of the invention immediately upon the pilot's release therefrom.
Figure 5:
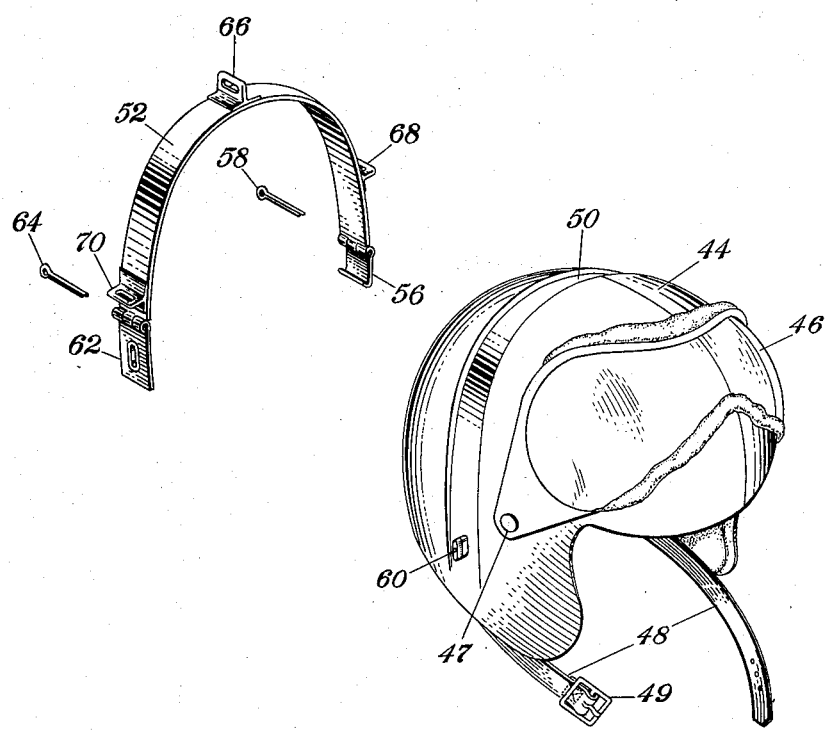
Fig. 5 is an exploded view of the head restraining band and helmet.

The head gear 44 worn by the pilot 10 is of the helmet type. This helmet has a protective eye shield 46 which is pivoted to the helmet body on pins 47. The eye shield is shown in the rest position in Fig. 1 but it can be lowered to the position shown in Fig. 4 to cover and protect the pilot's eyes. Helmet 44 is held securely on the pilot's head by straps 48 buckled together by buckle 49 (Fig. 5). As can better be seen in Fig. 5, the helmet 44 has a transverse channel 50 running from below ear level on one side to below ear level on the other side. Channel 50 is adapted to receive a band 52. Band 52 is a flexible metal strap having spring quality, i. e., it tends to spring toward a flat position. For that reason the band must be "wrapped" into the channel 50 of the helmet and its ends securely attached to hold it into position with the helmet. Band 52 is secured in position on the helmet on the left side by a protruding flat loop 54 (see Fig. 1) which cooperates with a hook 56. Band 52 and hook 56 are hinge joined together by a pin 58 which may be of the cotter pin type. The ends of pin 58 are bent slightly as shown in Fig. 1 so as to hold pin 58 securely in place but allowing it to be withdrawn by a pull on pin 58 in a rearward direction as seen in Fig. 1. The right side of band 52 is secured to the helmet 44 by a slot type fastener 60 which is placed in tab 62. Tab 62 is secured to band 52 by a pin 64 similar to pin 58. A loop 66 is firmly secured to the top of band 52. Intermediate pin 58 and loop 66 another loop 68 is attached on the left side of band 52 and a similar loop 70 is secured to band 52 on the right side of the helmet. The purpose of loops 66, 68 and 70 will be hereinafter explained.

The pilot 10 is secured in the seat by safety belt 72 which is releasably secured on either side to the seat by pins 74. Bifurcated brackets 76 are secured to plate 34 on each side of the pilot in the area of the plate above the pilot's shoulders. Fitting between the bifurcated ears of these brackets 76 are the ends of straps 78 releasably secured there by pins 80 which fit in aligned apertures in the brackets 76 and the straps 78. The other ends of straps 78 terminate in hooks 82 which hook onto the buckles 84 of the pilot's conventional parachute harness 86 thereby keeping the pilot securely retained against the back of the pilot's seat.

Cables 88, 90, and 92 are flexible members and are secured to the loops 66, 68, and 70 on the helmet band 52 by rotatable clamp fasteners 94, 96, and 98, respectively. Cable 88 runs over a pulley 100 which is secured to plate 34 by bracket 102. A plate 103 is rigidly secured on a bias, e. g., forty-five degrees, to and between vertical members 14 and 16. Cable 88 terminates in a biasing member or inertia reel 104 which is secured to plate 103 by screws or other suitable means. Two brackets 105 and 106 are rigidly secured to vertical members 14 and 16, respectively. Cable 90 runs over pulley 107 which is secured to plate 34 by bracket 108 and also runs over pulley 110 which is secured to the bracket 105 by bracket 112. Cable 90 terminates in inertia reel 114 which is also secured to bracket 105.

Cable 92 similarly runs over a pulley 116 which is secured by bracket 118 to plate 34. Cable 92 also runs over pulley 120 which is secured by bracket 122 to bracket 106. Cable 92 terminates in inertia reel 124 which is also secured to bracket 106 of vertical frame member 16.

Inertia reels 104, 114, and 124 are of similar construction and are of the type described in Patent No. 2,480,335. In principle, the inertia reel operates as follows. A drum around which a cable is wound is rotatably mounted to a base. Although the cable may be unwound, a spring means urges the drum to keep the cable wound and taut. A force along the rotational axis of the drum, such as rapid decelerations, will cause the drum to move against a spring and to engage a toothed sector of the drum with a toothed sector of the base. This provides a rachet type arrangement when the drum and base toothed sectors are meshed which prevents any further unwinding of the cable while the abnormal force exists.

It can be seen that the pilot, when subjected to extreme forces, is firmly secured in his seat by straps 72 and 78 and that the pilot's head will be firmly secured against head rest 36 by inertia reels 104, 114, and 124. The pilot's head is free to move to the right or left or downward as long as such movements are slow and as long as the airplane is not subjected to any abrupt decelerations. Inertia reel 104 is mounted on plate 103 with its axis in a diagonal direction so that any sudden decelerations in downward movement, vertical load when the seat is ejected, or horizontal load when the airplane is in an arrested condition will cause the inertia reel to lock and prevent the pilot's head from snapping downwardly. Inertia reels 114 and 124 have their axes transverse to the longitudinal axis of the aircraft. It can thus be seen that any violent movement of the airplane to the right or left will tend to lock the inertia reel 114 or 124 depending on the direction of the violent movement and prevent the pilot's head from snapping to either side.

It has been shown that the pilot is firmly restrained in his seat against all violent movements. The pilot's head has likewise been firmly secured to the head rest during any abrupt movement while being normally free for movement. If it is necessary to eject the pilot from the airplane, it is desirable to have him firmly secured in his seat and the restraining devices will function in the period of ejection of the pilot as well as during undesirable flight conditions.

To plate 34 is secured a dissociable unit 126 shown in greater detail in Fig. 6. A box portion 128 is firmly and rigidly secured to plate 34 while a top or lid portion 130 is releasably secured to box 128 as hereinafter described. Contained within box 128 is a timer mechanism (not shown), for example, such as that disclosed in Patent No. 2,415,911. This timer mechanism is started when the pilot pulls on lever 134 which has one end pivotally attached to plate 34 and the other end attached to the rip cord 136 of the drogue parachute 138 by clamp 140. Also attached to this latter end of lever 134 by a clamp 142 is a cable 144 which runs to a starting pin 146 of the timer mechanism. Upon releasing the drogue parachute on ejection from the plane and starting the timer, the timer, after a prescribed period of time has elapsed, will cause fork 147 to slide downwardly releasing clamps 148. Clamps 148 are pivotally attached at one end to box 128 and are retained in grooves 150 of top 130 by the position of fork 147 when fork 147 is in an upward position. Clamps 148 are urged to pivot towards each other and disengage themselves from grooves 150 by a tension spring 154 whose opposite ends are connected to the clamps 148. Therefore when fork 147 is caused to move downwardly by the timer mechanism to release clamps 148 for pivotal movement, spring 154 causes the clamps 148 to pivot inwardly and disengage from the grooves 150 in top 130. This releases top 130 which is secured to drogue parachute 138 by strap 152.

The pins 80 and 74, which secure the harness to the seat, and the pins 64 and 58, which secure the band 52 to the helmet 44, are connected to the rings 156 of top 130 by cables 157, 158, and 160, respectively.

The drogue parachute 138 is secured by its covering in a container 151 secured to plate 34. The function of the drogue parachute is old and well known. It is used to slow down a person or object from extreme velocities to intermediate or lower speed and, as used here, to prevent the pilot from tumbling after the seat is ejected and to slow down his forward speed. The drogue parachute 138 has a strap 152 which is secured to top 130 by ring 162. The risers from the drogue parachute 138 are attached to the strap 152. After the pilot has been ejected from the airplane, he pulls the lever 134 which causes the drogue parachute to open and since it is secured to the seat, it will slow down the rate of descent of the seat and the pilot. The pulling of lever 134 also pulls cable 144 and pin 146 thereby activating the timer mechanism. Lever 134 could be dispensed with by having the rip cord 136 and cable 144 secured to the aircraft fuselage so that the ejection of the seat would cause cord 136 and cable 144 to be pulled thereby causing the release of the pilot from the seat to be automatic. After the lapse of a predetermined period of time which will permit the drogue parachute to decrease the rate of fall of the pilot to a safe value, the timer mechanism in unit 126 unlocks top 130 from box 128. As shown in Fig. 4, the weight of the pilot and his seat will cause the drogue parachute 138 to pull on strap 152. Since strap 152 is secured to top 130 and since cables 157, 158, and 160 are all secured to top 130 by rings 156, all these cables will pull their respective pins 80, 74, 58, and 64 when the dissociable unit 126 is unlocked. It will be understood that pins 80, 74, and 64 are all of a type similar to pin 58, previously described wherein the ends of the pin are bent slightly to keep the pin in place, yet each pin is susceptible of being pulled from its position. The pulling of pins 80, 74, 58, and 64 disconnects the helmet, shoulder straps, and safety belt allowing the pilot to fall free of the seat. The pilot may then open his personal parachute for the descent in the customary manner.

It is apparent that an apparatus has been provided which will allow free movement of the head of a pilot under all normal conditions but which will firmly restrain the head against movement during conditions of extreme acceleration and deceleration. The apparatus also releasably secures the pilot in his seat for automatic release during a predetermined period of time after his ejection from the aircraft.

While only one embodiment of the invention has been shown in the accompanying drawings, it will be evident that various modifications are possible in the arrangement and construction of the components of the invention without departing from the scope thereof.

What is desired to be secured by Letters Patent is:

1. A device for aircraft for restraining the movement of the head of an occupant of said aircraft during sudden changes in the velocity of said aircraft comprising: a head gear adapted to be worn by said occupant; a flexible member connected to said head gear; means for exerting a force on said flexible member yieldably to pull said head gear in one direction; means responsive to sudden changes in the velocity of said aircraft parallel to said one direction and operatively associated with said last mentioned means for locking said flexible member against movement to prevent movement of said head gear parallel to said one direction and means including a drogue parachute having an operative connection with said flexible member and said head gear for disconnecting said flexible member from said head gear.

2. In an aircraft: a seat; a head rest secured to said seat; a head gear adapted to be worn by an occupant of said seat; a plurality of flexible members secured to said head gear; an individual biasing means for each of said flexible members, said biasing means yieldably restraining said head gear from movement in different directions; an individual locking means operatively associated with each of said biasing means for locking its associated flexible member against movement, each of said locking means being responsive to sudden changes in the velocity of movement of said aircraft parallel to one direction, said biasing means preventing movement of said head gear relative to said head rest upon occurrence of sudden changes in velocity of movement of said aircraft in any direction and means including a drogue parachute having an operative connection with said flexible member and said head gear for disconnecting said flexible members from said head gear.

3. In an aircraft, in combination, an ejectable seat for aircraft; a head rest associated with said seat; a head gear adapted to be worn by an occupant of said seat; a plurality of flexible members releasably secured to said head gear; an individual biasing means for each of said flexible members secured to said seat for yieldably pulling said flexible members in different directions; an individual locking means operatively associated with each of said biasing means for locking its associated flexible member against movement, each of said locking means being responsive to sudden changes in the velocity of movement of said seat, said locking means preventing movement of said head gear relative to said head rest upon occurrence of sudden changes in the velocity of movement of said seat; and means for disconnecting said flexible members from said head gear after the ejection of said seat from said aircraft including a drogue parachute operatively connected to said flexible members and said head gear.

4. An ejectable seat for aircraft comprising: a head rest secured to said seat; a head gear adapted to be worn by an occupant of said seat; a plurality of flexible members releasably secured to said head gear; an individual biasing means for each of said flexible members secured to said seat for yieldably pulling said flexible members in different directions; an individual locking means operatively associated with each of said biasing means for locking its associated flexible member against movement, each of said locking means being responsive to sudden changes in the velocity of movement of said seat in one direction and said locking means preventing movement of said head gear relative to said head rest upon occurrence of sudden changes in the velocity of movement of said seat; a drogue parachute operatively connected to said flexible members and adapted to be opened after said seat is ejected from an aircraft; and a timer mechanism operatively associated with said drogue parachute and said flexible members for disconnecting said flexible members from said head gear a predetermined period of time after the opening of said parachute.

5. A head gear comprising: a shell, said shell having an outer surface provided with a substantially U-shaped groove; a flexible spring band adapted to fit into said grooves; and means for releasably securing said band in said groove.

6. The device of claim 5 in which said means comprise a pair of securing members; a pair of releasing means pivotally connecting said pair of securing members to the ends of said band, said pair of securing members being adapted to secure said band to said shell, said ends resiliently opposing movement into said groove, said pair of releasing means being adapted to disconnect said pair of securing members from said ends to allow said band to disengage from said groove.

7. A seat adapted to be ejected from an aircraft comprising: a head rest secured to said seat; a head gear adapted to be worn by an occupant of said seat; a plurality of flexible members releasably secured to said head gear; an individual biasing means for each of said flexible members secured to said seat for yieldably pulling said flexible members in different directions; an individual locking means operatively associated with each of said biasing means for locking its associated flexible member against movement upon sudden changes in the velocity of movement of said seat parallel to one direction; said head rest and said flexible members preventing movement of said head gear relative to said head rest when locked by said locking means upon occurrence of sudden changes in the velocity of movement of said seat; means for securing an occupant to said seat; a drogue parachute secured to said seat and adapted to be opened after said seat is ejected from said aircraft; and a timer mechanism operatively associated with said drogue parachute, said flexible members, and said securing means for disconnecting said flexible members from said head gear and for releasing the occupant from said seat at a predetermined period of time after the opening of said drogue parachute.

8. A seat for aircraft comprising: a seat back; a head rest secured to said seat back; a head gear adapted to be secured to an occupant of said seat; a plurality of inertia reels secured to said seat back; a plurality of flexible members connecting said head gear to said inertia reels, said inertia reels being responsive to sudden changes in the velocity of the aircraft in predetermined directions for preventing movement of said head gear upon sudden changes in velocity of the aircraft in said predetermined directions and means including a drogue parachute having an operative connection with said flexible members and said head gear for disconnecting said flexible members from said head gear.

9. A restraining and releasing apparatus for an ejectable seat of an aircraft comprising: a harness for encompassing an occupant of said seat; a head gear adapted to be worn by said occupant; releasable connections between said harness and said seat at a plurality of points; a plurality of resilient members having releasable attachments to said head gear to restrain movement of said head gear; a drogue parachute operatively connected to said releasable connections and said releasable attachments adapted to be opened by the occupant of said seat after ejection of said seat from said aircraft; and a timer mechanism having a connection with and adapted to be operated by the opening of said drogue parachute, said timer having a detachable portion interposed in said operative connections between said drogue parachute and said releasable connections and releasable attachments whereby said detachable portion is released from said timer mechanism after a predetermined period of operation of the latter and thereby permits release of said releasable connections and releasable attachments by said drogue parachute.

10. A restraining and releasing apparatus for an ejectable seat of an aircraft comprising: a harness for encompassing an occupant of said seat; a head gear adapted to be worn by said occupant; a plurality of releasable pin connections between said harness and said seat; a plurality of resilient members each having a releasable pin attachment to said head gear to restrain movement of said head gear; a drogue parachute operatively connected to said releasable connections and said releasable attachments and adapted to be opened by the occupant of said seat after ejection from said aircraft; and a timer mechanism connected to said drogue parachute and adapted to be operated by the opening of the same, said timer having a detachable portion interposed in said operative connection whereby said detachable portion is released from said timer mechanism after a predetermined period of operation of the latter and thereby permits said opened drogue parachute to pull said releasable pin connections and releasable pin attachments.

11. A restraining and releasing apparatus for an occupant of an ejectable seat of an aircraft comprising: flexible members for yieldably securing said occupant within said seat; means for causing said flexible members to become unyielding; and means for automatically disengaging said flexible members from said occupant including a drogue parachute operatively connected to said flexible members.

12. A restraining and releasing device for an occupant of a seat comprising: a harness for encompassing said occupant; a plurality of cables; pin means for securing said cables to said harness; means including inertia reels operatively connected to said cables for normally maintaining the same in a yielding condition; means associated with said inertia reels for making said cables unyielding under conditions of sudden movements of said seat; and means for pulling said pin means whereby said occupant is released from said seat including a drogue parachute and timer mechanism operatively connected to said pin means.

13. A restraining and releasing device for an occupant of a seat comprising: flexible members for securing said occupant in said seat whereby said occupant is allowed movement within said seat under normal conditions; automatic means for rigidly holding said occupant in said seat under abnormal conditions of severe buffeting; and means for releasing said occupant from said seat including a drogue parachute operatively connected to said flexible members.

FRITHJOF J. LINDSTROM.

References Cited in the file of this patent

UNITED STATES PATENTS

| Number | Name | Date |
|---|---|---|
| 951,560 | Eaton | Mar. 8, 1910 |
| 2,267,103 | Ireland | Dec. 23, 1941 |
| 2,403,653 | Geohegan | July 9, 1946 |
| 2,542,248 | Heffernan | Feb. 20, 1951 |
| 2,557,313 | Quilter | June 19, 1951 |
| 2,569,638 | Martin | Oct. 2, 1951 |